Dec. 26, 1939. L. J. ARMS Re. 21,307

SOAP HOLDER AND APPLICATOR

Original Filed Feb. 17, 1937

INVENTOR.
Leland J. Arms.

BY

Chas. E. Townsend.
ATTORNEY.

Reissued Dec. 26, 1939 Re. 21,307

UNITED STATES PATENT OFFICE 21,307

SOAP HOLDER AND APPLICATOR

Leland J. Arms, San Francisco, Calif.

Original No. 2,127,901, dated August 23, 1938, Serial No. 126,188, February 17, 1937. Application for reissue April 26, 1939, Serial No. 270,250

9 Claims. (Cl. 15—122)

This invention relates to a soap holder and applicator, or what may be aptly termed a combination soap holder and sponge.

The object of the present invention is to provide a soap holder or applicator formed of sponge rubber or other suitable pervious material, said container having a compartment formed therein for the reception of a cake of soap, which, due to the action of water and manipulations of the hands of the user, such as kneading and rubbing, forms a lather which permeates and exudes from the surface of the pervious container; to provide a container having an opening formed therein to permit ready insertion of a cake of soap; to provide means for automatically closing and substantially sealing the opening after the insertion of the soap; to provide a container of the character described having an opening formed therein of undulating shape to prevent insertion of soap except refill cakes of predetermined shape; to provide a plate at one end of the container which is vulcanized or otherwise secured to the container, said plate having an undulating opening formed therein through which the soap is inserted, and said plate being constructed of a rigid or inflexible material such as hard rubber, Bakelite, metal or a combination of the same or similar materials, said hard material being provided to prevent cutting or otherwise changing the shape of the undulating opening; and further, to provide means whereby the container can be readily cleaned and small pieces or fragments of soap removed before insertion of a new cake of soap.

The soap holder and applicator are shown by way of illustration in the accompanying drawing, in which Fig. 1 is a side elevation in section, showing the soap holder and applicator;

Figure 1:
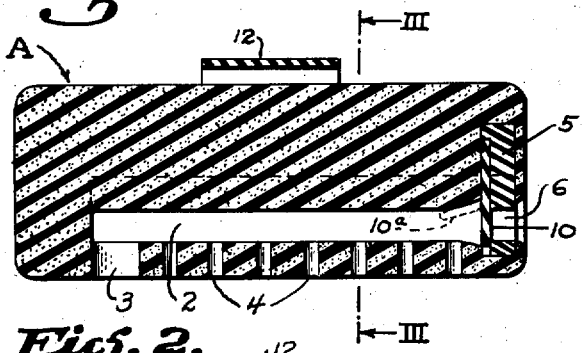
Figure 3:
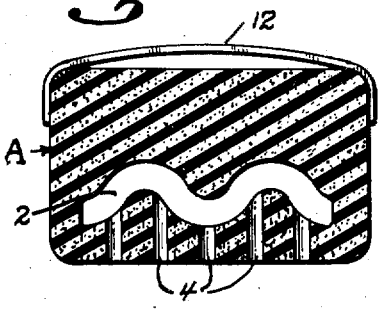
Fig. 3 is a cross section taken on line III—III, of Fig. 1.

Referring to the drawing in detail, and particularly to Figs. 1 and 3, A indicates in general a combination soap container and applicator which is constructed of sponge rubber or other suitable permeable material. Within the container is a compartment 2 which is formed for the reception of a cake of soap, preferably of the shape shown in Fig. 5. Extending through one face of the container and communicating with the soap compartment is one comparatively large opening 3, and a plurality of small perforations 4. The large opening is provided for cleaning purposes, as will hereinafter appear, while the small perforations serve to admit water to the soap-containing compartment, and at the same time permit free escape of soap lather. Vulcanized or otherwise secured to the other end of the container is a plate 5 which is constructed of hard rubber, Bakelite, metal or a combination of these or similar materials, and formed in the plate is an elongated opening 6 of undulating shape, through which the soap cake is introduced. Vulcanized or otherwise secured to the inner face of the plate (see Fig. 4) are a pair of flexible lips 7 and 8 which are formed of rubber or similar material. These lips spread apart when the soap cake is being introduced, but spring back or close the moment the soap is in place, thereby closing and substantially sealing the opening 6 so as to retain the soap and at the same time prevent escape of lather through the opening.

Figure 4:
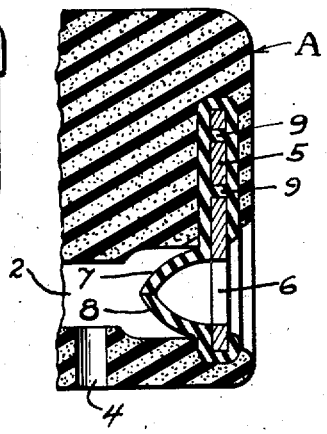
Fig. 4 is an enlarged longitudinal section showing one form of closure for the opening through which the soap is inserted.

In Fig. 4 the plate 5 is shown as made of metal. In that case, the rubber forming the lips 7 and 8 is carried around the upper and lower edges of the plate, and also through perforations 9 punched therein so as to form a permanent bond when vulcanized. The plate thus partially covered with rubber is in turn vulcanized or otherwise secured to the sponge rubber, and is set into the body of the rubber a sufficient distance to avoid any projections or protuberances of a rigid character which might prove annoying when using the device for sponging the body.

Figure 6:
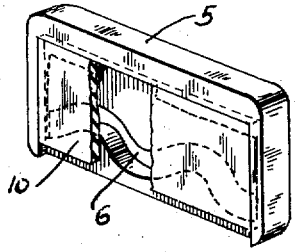
Fig. 6 is a perspective view partially broken away showing the rear surface of the plate employed in Fig. 1.

In Fig. 1, the plate 5 is shown as made from hard rubber, Bakelite, or the like, and on its inner face is formed a recess in which is mounted a flexible rubber flap 10. This flap (see Fig. 6) is secured to the plate along its upper edge and ends by being vulcanized or otherwise treated. This leaves the lower edge free, and when a cake of soap is introduced through the opening 6, the flap will yield and assume the position shown at 10*a* (see Fig. 1), after which it will spring back and close the opening.

Figure 5:
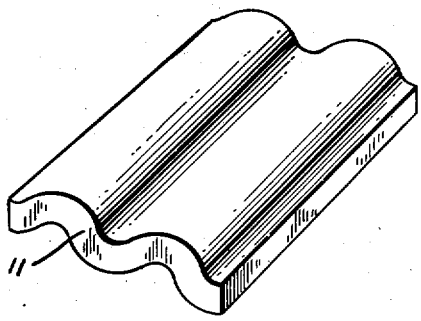
Fig. 5 is a perspective view of the soap cake employed, said view showing the shape thereof.
Figure 2:
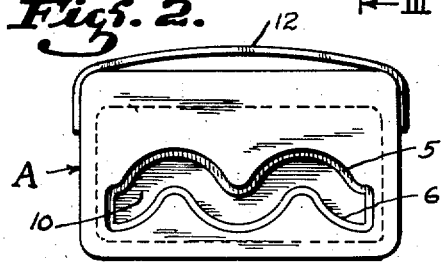
Fig. 2 is an end view of the same.

A plate of rigid or inflexible material is desirable, as it would otherwise be possible to change the shape of the opening by cutting or bending and thus permit insertion of almost any kind of soap. By forming the opening of definite shape and in a rigid material, cakes of soap of predetermined form must be employed. An undulating shape such as shown at 11 in Fig. 5 is most desirable, as it provides a larger area for the formation and liberation of lather; a larger quantity of soap is obtained, and as such will require less frequent refilling. Furthermore, soap of a given quality or grade can be assured, as it will be made in a specified form or shape.

For convenience in use, a strap or band 12 may be provided. This will be made of rubber or similar flexible material to permit the hand of the user to be slipped through, or to permit the device as a whole to be attached to one arm or another while taking a shower or bath.

In actual operation, when water is applied and the holder or applicator is rubbed or kneaded between the hands of the user, lather is freely formed and liberated, and permeates and exudes from the entire body of the applicator, but more so through the perforations 4. The lather thus produced may be applied by merely rubbing the hands over the applicator and then transferring it to the body or particular place to which the lather is to be applied; or the lather may be directly applied by rubbing the applicator against the body, in which case the applicator will also function as a sponge. Suffice it to say that the device is exceedingly handy either in the shower or bath, as it liberates an abundance of lather and permits ready application of the lather wherever desired. It is not readily dropped or lost, as is the case with a cake of slippery soap, because it may be attached either to the hand or arm of the user. It is readily cleaned by merely holding the insert-opening 6 against a faucet. Small pieces of soap are at the same time readily removed through the large opening 3, as they may be broken up by merely bending or squeezing the applicator. When water pressure is applied, they will be flushed out through this opening. A good quality of soap will be insured, as only refill cakes of predetermined form or manufacture may be employed, and waste is reduced to a minimum.

While sponge rubber has been specified, other permeable materials such as fabrics, etc., may be employed, or a combination of permeable material and rubber may be used; also, while certain other features of my invention have been more or less specifically described and illustrated, I wish it understood that changes may be resorted to within the scope of the appended claims, and that the material and finish of the several parts employed may be such as the manufacturer may decide, or varying conditions or uses may demand.

Having thus described and illustrated my invention, what I claim and desire to secure by Letters Patent is:

1. A combination soap holder and applicator comprising a body portion formed of a permeable material and having a compartment formed therein for the reception of a cake of soap, a rigid plate secured in one end of the body and having an opening formed therein through which a cake of soap is insertable, and means for automatically closing said opening.

2. A combination soap holder and applicator comprising a body portion formed of a permeable material and having a compartment formed therein for the reception of a cake of soap, a rigid plate secured in one end of the body and having an elongated opening formed therein of undulating form through which a cake of soap of similar form is insertable, and means for closing said opening after the insertion of a cake of soap.

3. A combination soap holder and applicator comprising a body portion formed of a permeable material and having a compartment formed therein for the reception of a cake of soap, a rigid plate secured in one end of the body and having an elongated opening formed therein of undulating form through which a cake of soap of similar form is insertable, and means for automatically closing said opening after insertion of a cake of soap.

4. A combination soap holder and applicator comprising a body portion formed of a permeable material and having a compartment formed therein for the reception of a cake of soap, a substantially rigid plate secured in one end of the body and having an elongated opening formed therein of undulating form through which a cake of soap of similar form is insertable, and a flexible member disposed adjacent one side of the opening to form a closure therefor, said closure permitting insertion of a cake of soap and automatically closing after insertion of the soap.

5. A combination soap holder and applicator comprising a body portion formed of a permeable material and having a compartment formed therein for the reception of a cake of soap, a rigid plate secured in one end of the body and having an elongated opening formed therein of undulating form through which a cake of soap of similar form is insertable, and a pair of flexible lips secured with relation to the inner face of the plate and forming a closure for the opening, said lips permitting insertion of a cake of soap and automatically closing after the soap is inserted.

6. A combination soap holder and applicator comprising a body portion formed of a permeable material and having a compartment formed therein for the reception of a cake of soap, and a rigid plate secured in one side of the body and having an elongated opening formed therein in communication with the compartment through which a cake of soap of similar shape is insertable.

7. A combination soap holder and applicator comprising a body portion formed of a flexible permeable material and having a compartment formed therein extending through one side of the body to form a mouth, a rigid plate secured in the body transverse of the mouth, said plate having an elongated opening formed therein of undulating form, through which a cake of soap of similar form is insertable, said plate securing the cake of soap against removal after insertion.

8. A combination soap holder and applicator comprising a sponge body having a compartment formed therein for the reception of a cake of soap, with outlets connecting the compartment with the applicator surface of the body, and a rigid plate interposed in the body transversely of the compartment and in a plane intersecting the compartment, said plate having an opening formed thereon in communication with the compartment through which the soap may be inserted.

9. A combination soap holder and applicator comprising a sponge body having a compartment formed therein for the reception of a cake of soap, and a rigid plate interposed in the body transversely of the compartment and in a plane intersecting the compartment, said plate having an opening formed therein in communication with the compartment through which the soap may be inserted, the opening in said plate being of irregular form.

LELAND J. ARMS.